March 21, 1950 R. A. HAWN 2,501,217
ADJUSTABLE DRIVE SHAFT
Filed Oct. 24, 1945 2 Sheets-Sheet 2

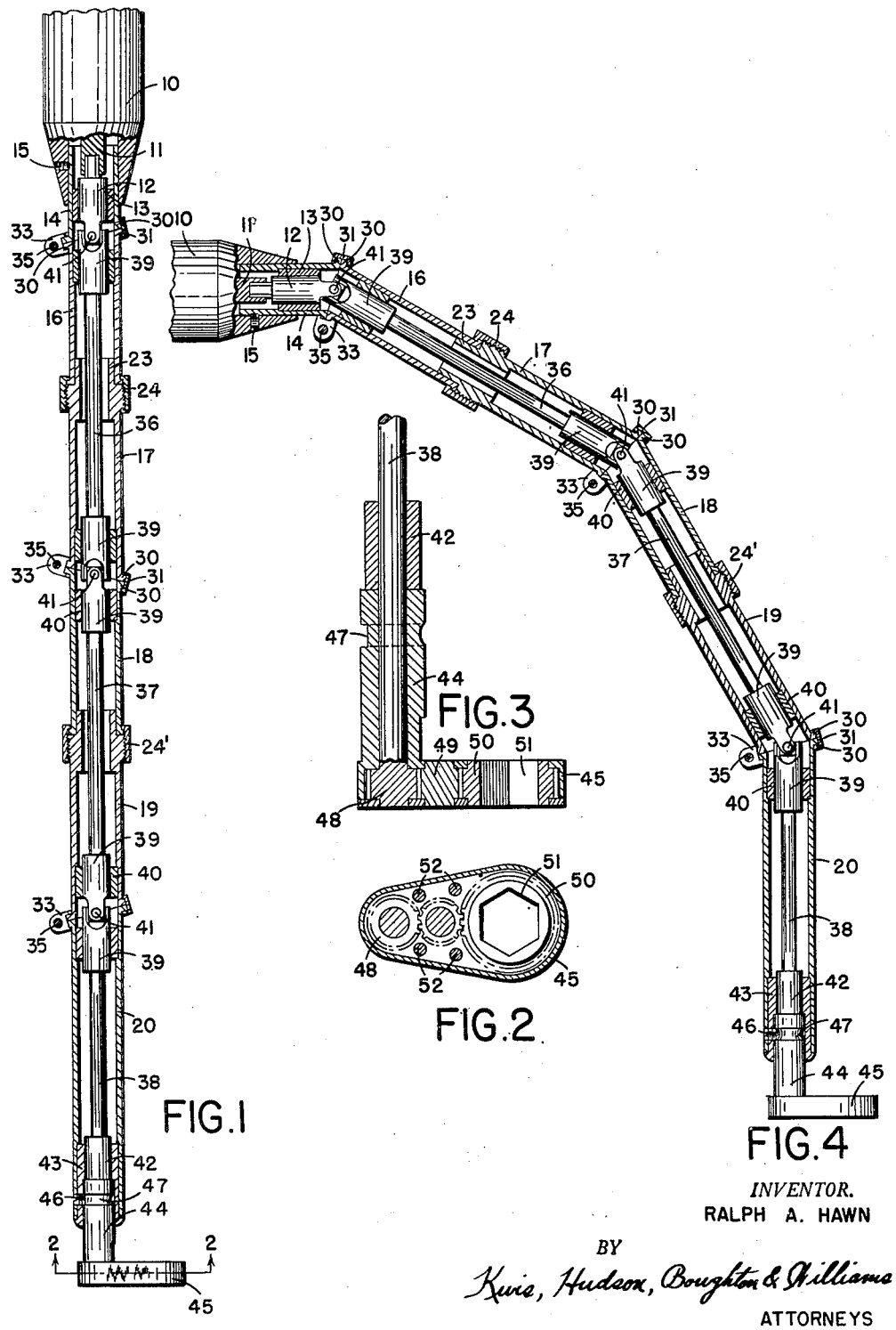

INVENTOR.
RALPH A. HAWN
BY
Kwis, Hudson, Boughton & Williams
ATTORNEYS

Patented Mar. 21, 1950

2,501,217

UNITED STATES PATENT OFFICE 2,501,217

ADJUSTABLE DRIVE SHAFT

Ralph A. Hawn, Cleveland, Ohio, assignor to The Cleveland Pneumatic Tool Company, Cleveland, Ohio, a corporation of Ohio Application October 24, 1945, Serial No. 624,234

5 Claims. (Cl. 64—2)

This invention relates to improvements in adjustable drive shafts, more particularly shafts made up of a plurality of rigid shaft sections connected together by universal joints, the sections being mounted within tubular casing members which are adjustable and arranged to be locked in selected positions of adjustment.

One of the objects of the invention is the provision of a shaft mechanism for rotary power tools which comprises relatively movable portions, the relative positions of which may be adjusted and held in adjustment so that fastenings which would be inaccessible otherwise may be reached for operation.

Another object is the provision of mechanism of the character described in which the rotary means for engaging a rotatable fastening, such as a screw or nut, is offset laterally from the end of the shaft, an arrangement which has advantages from the standpoint of visibility and accessibility.

Other objects and features of novelty will appear as I proceed with the description of that embodiment of the invention which, for the purposes of the present application, I have illustrated in the accompanying drawings, in which Fig. 1 is a longitudinal sectional view through a drive shaft mechanism embodying the invention.

Fig. 2 is a detail sectional view on a larger scale taken substantially on the line 2—2 of Fig. 1.

Fig. 3 is a detail sectional view of the lower portion of the mechanism appearing in elevation in Fig. 1, but on the same scale as Fig. 2.

Fig. 4 is a longitudinal sectional view of the complete mechanism, but in a different condition of adjustment from that of Fig. 1.

Figure 5:
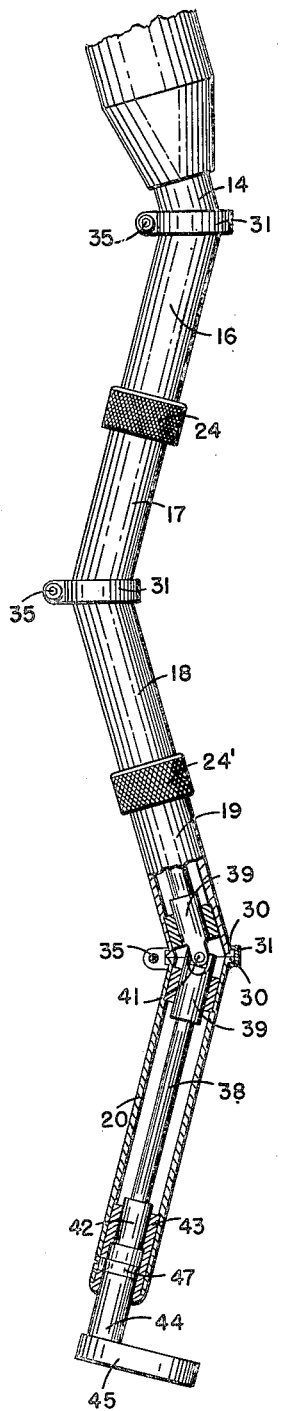
Fig. 5 is a similar view, partly in section and partly in elevation, showing the shaft mechanism in still another position of adjustment.

In the drawing 10 represents the output end of the body of a rotary power tool having a shaft 11 provided with a polygonal socket to receive a complementary polygonal extremity on a short shaft section 12 that is journaled in a sleeve or bushing 13 carried by a cylindrical casing member 14, the latter fitting within the body 10 of the power tool and held there by a setscrew 15 or other suitable means.

Figure 6:
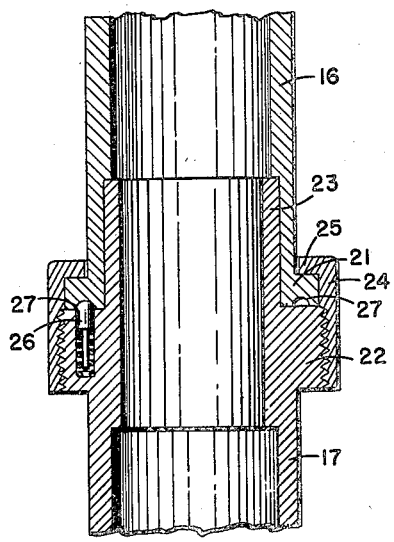
Fig. 6 is a detail sectional view on a larger scale showing relatively rotatable parts of a casing member and means for locking them in selected position, this view being a modification in some respects of the corresponding joint in Figs. 1 and 4.
Figure 7:
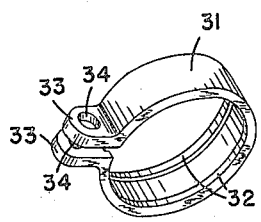
Fig. 7 is a detail perspective view of a locking collar for clamping together the meeting ends of two casing members.

The balance of the casing is made up of a second member having two parts 16 and 17, a third member in two parts 18 and 19, and a final one-piece member 20. The parts 16, 17 and 18, 19 of the two-part members are connected together by a rotatable joint which is illustrated somewhat in detail in Fig. 6 of the drawing. Referring to this figure, it will be noted that the part 16 has a terminal flange 21 disposed in a plane at right angles to the axis of the parts 16, 17. Part 17 is provided with an annular enlargement 22 which is adapted to seat against the flange 21 and with a terminal cylindrical portion 23 of reduced diameter which is rotatably mounted within the part 16. The part 16 may be counterbored to receive the terminal portion 23, as in Fig. 6, but as illustrated in Figs. 1 and 4 the part 23 may be made of a diameter small enough to fit within the unmodified internal surface of part 16. The flange 21 may be clamped tightly upon the enlargement 22 by means of a collar 24 or 24' threadably mounted on the enlargement and having an inturned flange 25 for engagement with the flange 21. In order to assist the operator in effecting a desired angular adjustment the enlargement 22 is provided with a bore in which is mounted a spring detent 26 with a spherical end which is adapted to enter any one of a series of regularly spaced sockets 27 in flange 21. When an adjustment is to be effected the collar 24 is loosened and one of the parts 16, 17 is rotated relative to the other. As the detent 26 reaches one of the sockets 27 a metallic click informs the operator that the rotation has progressed through a certain angle. By counting the clicks he can make the adjustment through any angle which is a multiple of the angle by which adjacent sockets are spaced. When that has been done he tightens the collar 24 and the two parts 16, 17 are thereby clamped together so as to constitute them in effect a single rigid casing member.

The novel joints between the casing members, whether one-piece or two-piece, will now be described. They are identical in construction, and one only will be described in detail, namely that between the parts 17 and 18 of casing members 16, 17 and 18, 19. The meeting ends of the members are finished to conform with terminal planes, each of which is disposed at a predetermined angle to the axis of its member. The terminal members 14 and 20 of course have but one end so finished. The angle illustrated in the drawing is 15°. An angular flange 30 parallel to this terminal plane is formed at each joint end. The intermediate casing members, that is 16, 17, and 18, 19, each have these angularly disposed terminal planes and flanges at both ends, but the two planes of each member are oppositely disposed, so that if extended they would meet in a line to one side of the member and at right angles to its axis.

In order to hold each pair of contacting flanges 30 in proper cooperating relation a split ring clamp 31 of channel shape in cross-section is caused to surround the meeting flanges, the side walls 32 of the channel as well as its peripheral wall snugly engaging the flanges 30. Means are provided for opening and closing the clamp, and in the present case this means may consist of a pair of ears 33 provided with perforations 34 for the reception of a bolt 35 or the like. When the bolt is loosened somewhat the members on either side of the joint may be turned relatively, and when the desired adjustment has been reached the bolt is tightened so as to lock the joint in adjusted position.

The power transmitting means is made up of a series of shaft sections 36, 37 and 38 in addition to the previously mentioned section 12. The intermediate sections 36 and 37 each have enlargements 39 at both ends which may be secured upon or made integral with the shafts proper. These enlargements 39 are rotatably mounted in bushings 40 carried by the casing members, and at their extremities are formed to constitute elements of universal joints 41. The parts are so designed and arranged that the center point of each universal joint lies in the inclined plane between the flanges 30 on the meeting casing members. The large part of short shaft 12, previously described, may be identical with the enlargements 39.

The outer end of shaft 38 is provided with an enlargement 42 which is rotatable in a bushing 43, the enlargement 42 having plane ends, one of which seats against a housing 44 that has a laterally projecting foot 45. Housing 44 is fixed within the casing member 20 and its bushing 43 by means of a setscrew 46 extending into groove 47 in the housing.

Housing 44 has a central bore accommodating shaft 38. On the extremity of this shaft within the hollow foot 45 there is fixed a pinion 48. A second pinion 49 journaled in the top and bottom walls of foot 45 meshes with pinion 48 and also with a gear 50 which is externally recessed at both ends to provide shoulders for engagement with the top and bottom plates of the housing foot surrounding circular holes therethrough. The gear 50 thus has exterior rotary bearings in these two plates. In the illustrated case the device is designed for driving hex nuts or hex-headed studs. Gear 50 is therefore provided with a hexagonal passage 51 therethrough, which may be placed over the fastening to be driven. The number of teeth in the gear 50 being much greater than in the pinion 48, the rotational speed of gear 50 is reduced relative to the rotational speed of shaft 38, and the torque correspondingly increased. The foot 45 is preferably split into two parts which may be held together by a plurality of bolts 52, see Fig. 2.

The drive shaft of this invention may be constructed with two or any other number of shaft sections greater than one, and a corresponding number of casing members. Inasmuch as the shaft sections are solid rods connected by universal joints of good capacity, positive transmission of torque results. By so disposing the various casing members at each joint that the low point of one flange 30 lies opposite the high point of the adjacent contacting flange 30, the complete shaft mechanism will be disposed in a straight line as illustrated in Fig. 1. If the high points and low points are brought together at each joint, as in Fig. 4, the short shaft 12 and its casing member 14 will stand at right angles to the terminal shaft section 38 and its casing member 20. This figure represents the maximum deviation possible with 15° inclination of the casing ends and the number of casing members and shafts shown. An infinite number of different adjustments between these two extremes is possible, Fig. 5 illustrating one such intermediate adjustment. The change from the Fig. 4 condition to that of Fig. 5 can be effected without altering any of the angular joints, by merely loosening both of the locking collars 24 and 24', turning the casing part 17 through an angle of 180° from the Fig. 4 position and similarly turning the casing part 19 180° from the Fig. 4 position. The collars 24 and 24' are then tightened again and the casing members are thereupon held in the adjustment shown in Fig. 5. In order to fit the device into locations where obstructions of different size and kind must be avoided, it is frequently necessary to utilize the adjustment provisions of one or more of the straight joints and one or more of the angular joints as well. It will be appreciated of course that the angularity of the joints between casing members may be different from that illustrated and that a greater or lesser number of casing members and corresponding shaft sections may be employed if desired.

In the foregoing description I have necessarily gone somewhat into detail in order to explain fully the particular embodiment of the invention herein illustrated, but I desire it to be understood that such detailed disclosures are not to be construed as amounting to limitations, except as they may be included in the appended claims.

Having thus described my invention, I claim:

1. In an adjustable drive shaft, a pair of shaft sections, the meeting ends of said sections being connected together by a universal joint, a cylindrical casing member for each section carrying bearings for that section, the meeting ends of said casing members terminating in a common plane angularly related to the axes of the members, the center of said universal joint lying in said plane, and means including a split ring clamp holding said casing members together.

2. In an adjustable drive shaft, a pair of shaft sections, the meeting ends of said sections being connected together by a universal joint, a cylindrical casing member for each section carrying bearings for that section, the meeting ends of said casing members being flanged and terminating in a common plane angularly related to the axes of the members, the center of said universal joint lying in said plane, and means including a split channel collar holding said flanges together.

3. In an adjustable drive shaft, a pair of shaft sections, the meeting ends of said sections being connected together by a universal joint, a cylindrical casing member for each section carrying bearings for that section, the end of each casing member as it meets the other member terminating in an inclined plane, each of said planes cutting the axis of its member at the same angle, whereby the casing members may be brought into alignment or may be rotated relatively 180° from aligning position to a position of maximum deviation from alignment, the center of said universal joint lying in the merged planes of the meeting ends of said casing members, and means including a split ring clamp holding the casing members together in any position of adjustment.

4. In an adjustable drive shaft, a pair of cylindrical casing members carrying shaft bearings, the end of each casing member as it meets the other member terminating in a plane angularly related to the axis of that member, means for holding said casing members together, one of said casing members being divided into two parts which are rotatable relatively to each other, and means including a split ring clamp securing said parts against rotation.

5. In an adjustable drive shaft, a plurality of shaft sections, the meeting ends of each pair of successive sections being connected together by a universal joint, a cylindrical casing member for each section carrying bearings for that section, the meeting ends of each pair of adjacent casing members terminating in a plane angularly related to the axes of those members, means for holding the ends of those members together, one casing member of each pair being divided into two parts which are rotatable relatively to each other, and means including a split ring clamp holding said parts against rotation.

RALPH A. HAWN.

REFERENCES CITED

The following references are of record in the file of this patent:

UNITED STATES PATENTS

| Number | Name | Date |
|---|---|---|
| 597,469 | Marshall | Jan. 18, 1898 |
| 1,739,756 | Granville | Dec. 17, 1929 |
| 1,817,000 | Granville | Aug. 4, 1931 |
| 1,886,952 | Hodreaux | Nov. 8, 1932 |
| 2,073,903 | O'Niel | Mar. 16, 1937 |

FOREIGN PATENTS

| Number | Country | Date |
|---|---|---|
| 5,549 | Great Britain | 1903 |
| 343,880 | Germany | 1921 |